(No Model.) 2 Sheets—Sheet 1.
W. & R. RUFFIN.
WHEEL CULTIVATOR AND FERTILIZER DISTRIBUTER.
No. 336,163. Patented Feb. 16, 1886.
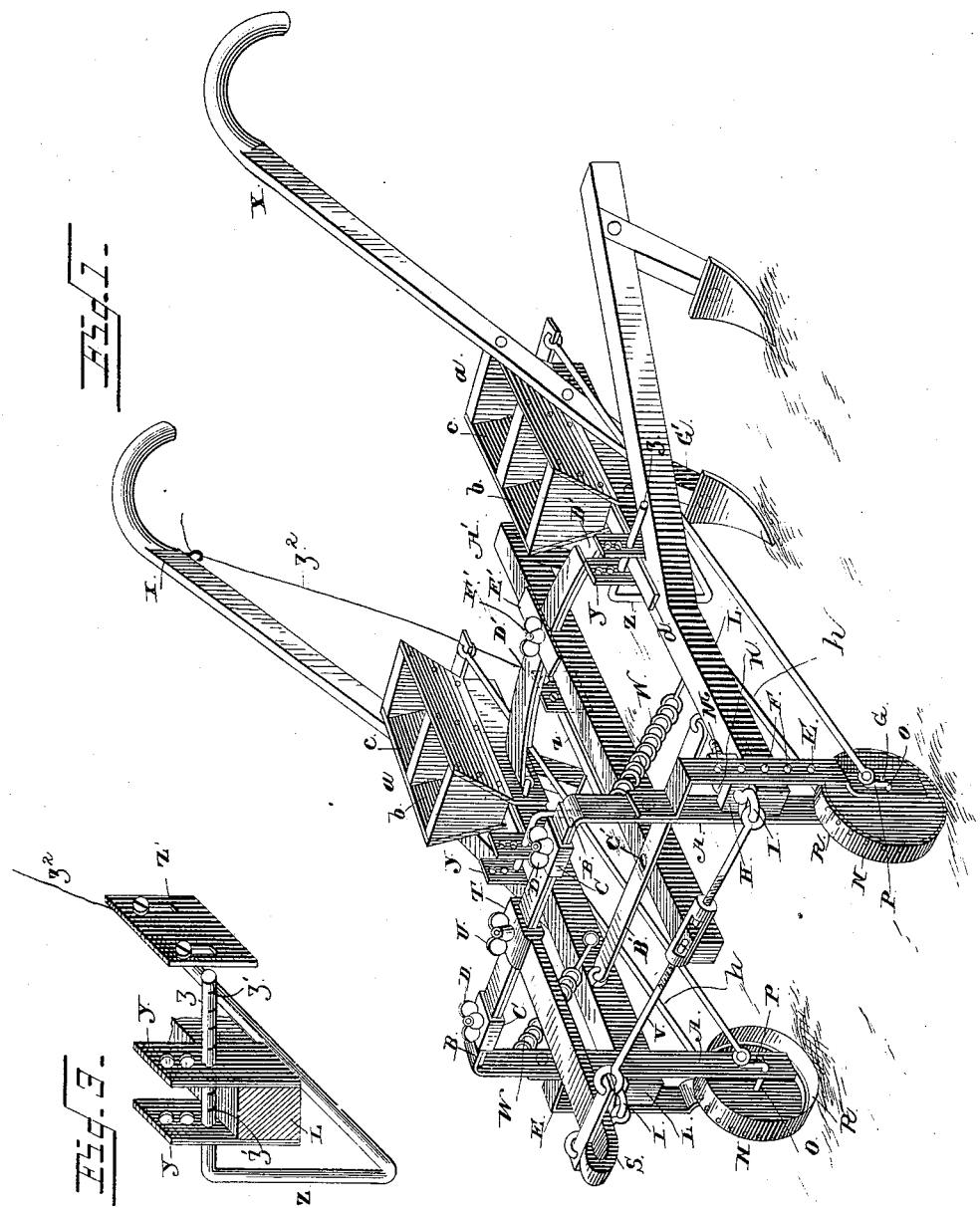
WITNESSES
M. E. Fowler
J. W. Garner
INVENTOR
William Ruffin
and Robert Ruffin
By C. A. Snow & Co.
their Attorneys

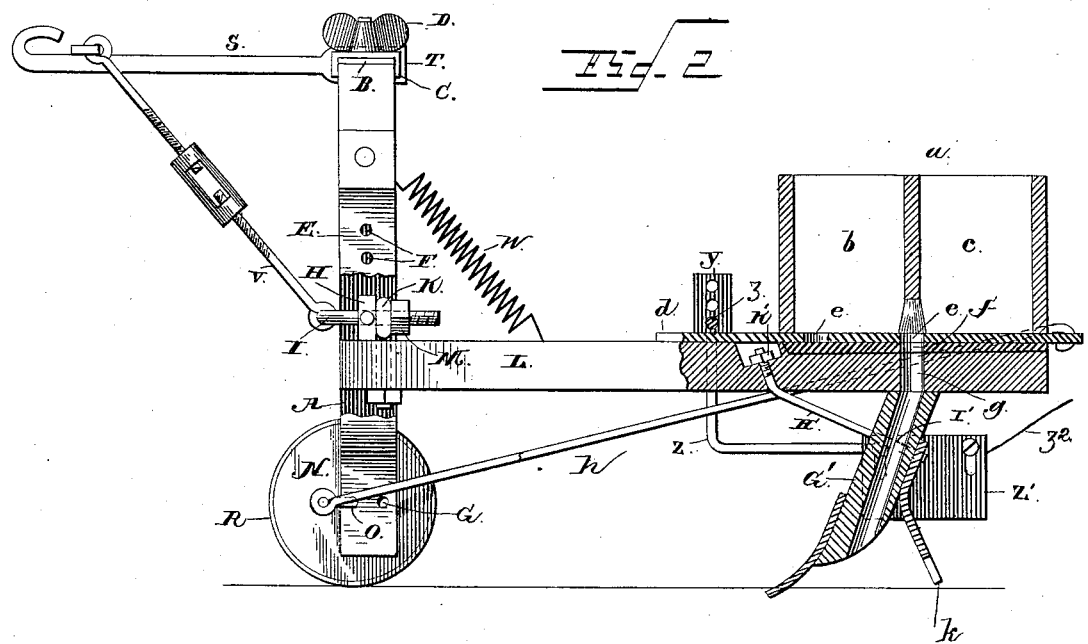
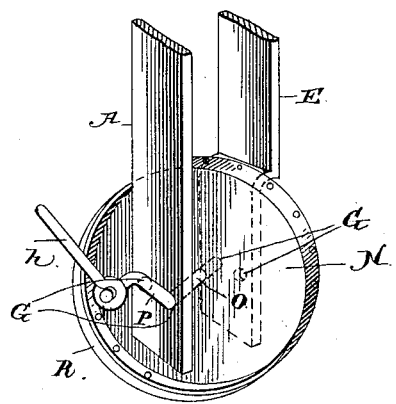

UNITED STATES PATENT OFFICE.

WILLIAM RUFFIN AND ROBERT RUFFIN, OF COMO, MISSISSIPPI.

WHEEL CULTIVATOR AND FERTILIZER-DISTRIBUTER.

SPECIFICATION forming part of Letters Patent No. 336,163, dated February 16, 1886.

Application filed September 21, 1885. Serial No. 177,715. (No model.)

*To all whom it may concern:*

Be it known that we, WILLIAM RUFFIN and ROBERT RUFFIN, citizens of the United States, residing at Como, in the county of Panola and State of Mississippi, have invented new and useful Improvements in a Combined Wheel Cultivator and Fertilizer-Distributer, of which the following is a specification, reference being had to the accompanying drawings.

Our invention relates to an improvement in combined wheel cultivators, planters, and fertilizer-distributers; and it consists in the peculiar construction and combination of devices that will be more fully set forth hereinafter, and particularly pointed out in the claims.

In the drawings, Figure 1 is a perspective view of our invention. Fig. 2 is a side elevation of the same, partly in section. Fig. 3 is a detailed perspective view of one of the fenders. Fig. 4 is a similar view of one of the rotating supporting plow-wheels.

A represents vertical standards, that are bent horizontally at their upper ends, as at B, forming horizontal arms adapted to slide on each other, so as to adjust the standards laterally. These arms pass through sleeves or keepers C, having set-screws D for clamping the arms together and securing the standards at any desired lateral adjustment. On the outer sides of the standards are bolted bracket-plates or jambs E, said jambs and standards having the series of vertically-arranged openings F, and the series of horizontally-arranged openings G. Bars H are journaled in the openings F, and through the centers of said bars pass eyebolts I, the rear threaded ends of which pass through eyes or bolts K, that are secured in the front ends of cultivator-beams L, and nuts M are screwed on the ends of the bolts I and secure the cultivator-beams to the standards, the said beams being independent of each other and free to move vertically and laterally at their rear ends, as will be readily understood.

N represents supporting-wheels, the shafts O of which are journaled at the lower ends of the standards, so that the wheels run directly in front of the plows. The shafts O are provided with cranks P on their ends, as shown. On the rims of the supporting-wheels are secured circular knives R, that project laterally from the inner edges of the wheels, the inner edges of said knives being sharpened.

S represents a short draft-bar, having a sleeve or keeper, T, at its rear end, through which pass the sliding horizontal arms of the standards and a set-screw, U. By this means the draft-bar is movable laterally on the arms of the standards, and can be secured at either side or in the center between the standards, as desired. The front end of the draft-bar is adapted for the attachment of the draft-animal, and thus the tongue or thills are entirely dispensed with, enabling the machine to be run entirely to the ends of the rows and to be turned in a short space.

V represents extensible rods, that are connected to the eyes of the bolts I and to the draft-bar, by which means the draft is applied directly to the ends of the beams of the cultivators. The rods V are made extensible to allow the draft-bar to be shifted laterally, as before described.

W represents coiled retractile springs, connected to the vertical standards and the cultivator-beams to support the latter and assist the operator to raise them from the ground by means of the handles X, with which the cultivators are provided. The cultivator-beams have lugs Y projecting from their upper sides, and through openings in these lugs are passed the upper horizontal arms, $z$, of bent fender-rods Z. Notches $z'$ are made on the under sides of the arms $z$, which notches fit on the lower sides of the openings in the lugs and secure the fender-rods at any desired lateral adjustment. Fenders Z' are attached to the free ends of the fender-rods, and said fenders may be raised or lowered by means of cords $z^2$ attached to them and extending to the handles.

By means of having the supporting-wheels directly in front of the cultivators, and by having the cultivators laterally adjustable, it will be seen that when the plants are too large to permit the cultivators to "straddle" the rows the cultivators may be drawn as near together as possible and the machine drawn between the rows, cultivating one-half of each row at the same time. When the wheels are set with their axles at right angles to the beams, they merely roll along on the ground and serve to support the front ends of the beams and regulate the "pitch" or depth in which the cultivators work; but when the axles of the wheels are set obliquely or at other than a right angle in the standards their cutting-edges run obliquely to the line of draft. The weight upon the wheels forces them down into the ground, and as they run obliquely to the line of draft the friction of the earth on the said wheels or disks causes them to rotate, and thus grind or cut into the ground and loosen the soil and cut and clear away weeds and trash in advance of the plows. The series of horizontally-arranged openings in the lower ends of the standards enable the wheels to be thus arranged, as shown in Fig. 4.

A' represents a central cultivator-beam, secured between the outer beams, L, by means of a bar, B', loosely connected at its ends near the front ends of the beams L, and a bolt, C', that passes through a central opening in the bar B' and enters the central beam near the front end of the latter. Bars D' are hinged to the inner sides of the beams L, near the rear ends of the latter, and the free ends of these bars pass through a sleeve or keeper, E', secured on the upper side of the central beam, near the rear end of the latter. A set-screw, F', is provided for the keeper, and bears on the free ends of the bars D' to clamp them to the central beam. The beams are each provided with the usual standards, G', for the attachment of the cultivator teeth or shovels. Brace-rods H' are threaded on their upper ends and pass obliquely up through the cultivator-beams near their rear ends, and the lower ends of said rods have clamps or yokes I', that embrace the standards. Nuts K' are screwed on the upper ends of the brace-rods to tighten the standards.

In order to adapt the machine for planting corn, peas, or cotton, and for distributing fertilizer, we provide boxes $a$, divided each into two compartments, $b$ and $c$, and adapted to be secured on the beams L. Slides $d$ reciprocate below the bottoms of the boxes, and have openings $e$ for the passage of seeds or fertilizer, which openings alternately register with an opening, $f$, in the bottom of the boxes, and with the upper ends of openings or bores $g$ made through the standards G' to serve as spouts to convey the seeds or fertilizer to the ground.

When cotton is being planted, the seed-slides are provided with stirring-spikes to prevent the seeds from becoming clogged or packed in the boxes, and when planting corn or peas brushes are arranged over the openings in the bottoms of the boxes. The seed-slides are reciprocated by means of pitman-rods $h$ connecting them with the cranks on the wheel-axles.

In the cultivation of corn and cotton in the South, it is customary to first "scrape" or "bare" each side of the row first, and then follow that operation with a small shovel-plow, first running in the bare furrows and then running a central furrow, "splitting out the middle" of the row.

By means of our invention, when the central cultivator is employed we can perform all these operations simultaneously, thus effecting a great saving of time, labor, and expense. Covering-wings $k$ are secured to the clamps or yokes I' on the cultivator-standards when the machine is used for planting, in order to cover the seeds deeply and secure a "stand."

Having thus described our invention, we claim—

1. The combination of the vertical standards having the horizontal connecting-arms and the supporting-wheels, the trailing plows or cultivators attached to the standards, the draft-bar secured at its rear end to the horizontal connecting-arms and adapted to be shifted laterally thereon, and the extensible rods connecting the front end of the draft-bar and the standards, substantially as described.

2. The combination of the wheel-standards having a series of horizontally-disposed openings, G, and the supporting-wheels provided with lateral cutting-edges, and having their axles journaled in said openings, either at right angles to the line of draft or obliquely thereto, substantially as and for the purpose described.

3. The combination of a plow or cultivator having the lugs Y, and a fender having a horizontal arm, $z$, notched on its under side and secured in openings in the lugs, substantially as described.

4. The combination of a plow or cultivator-beam, perforated lugs Y, secured thereon, a fender-supporting arm mounted in the lugs and adapted to be adjusted vertically and laterally therein, and a fender adjustably secured to the free end of the arm, substantially as described.

In testimony that we claim the foregoing as our own we have hereunto affixed our signatures in presence of two witnesses.

WILLIAM RUFFIN.
ROBERT RUFFIN.

Witnesses:
W. S. McGEE,
T. H. McKENZIE.